(No Model.)

P. R. ERLING.

ANIMAL TRAP.

No. 298,361. Patented May 13, 1884.

Witnesses;
H. A. Staples
M. M. Stacy

Inventor
Peter R. Erling
By Wm. Zimmerman
Attorney.

UNITED STATES PATENT OFFICE.

PETER R. ERLING, OF CHICAGO, ILLINOIS.

ANIMAL-TRAP.

SPECIFICATION forming part of Letters Patent No. 298,361, dated May 13, 1884.

Application filed June 4, 1883. (No model.)

*To all whom it may concern:*

Be it known that I, PETER R. ERLING, of Chicago, in the county of Cook and State of Illinois, have invented certain new and useful Improvements in Animal-Traps; and I hereby declare the following to be a full, clear, and exact description thereof, which will enable others skilled in the art to which my invention relates to make and use the same, reference being had to the accompanying drawings, forming a part hereof, and in which—

Figure 1:
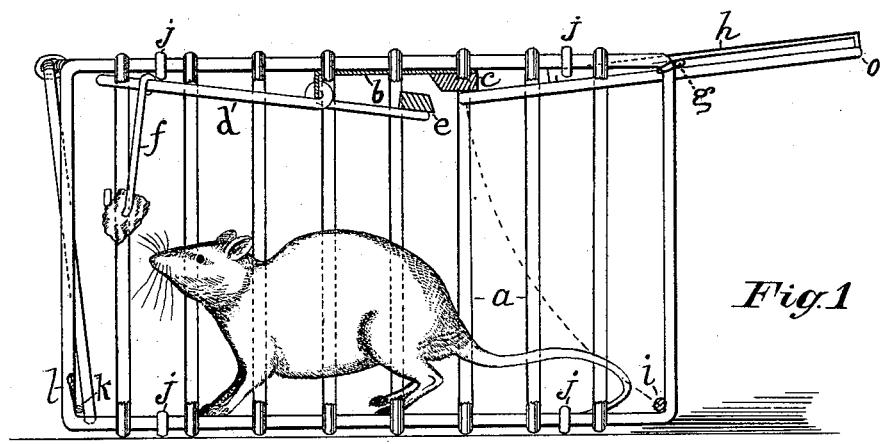
Figure 2:
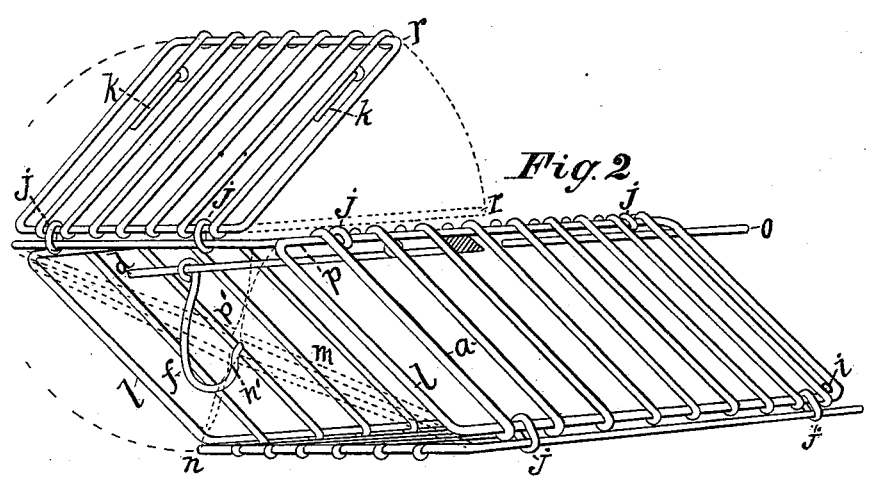
Figure 4:
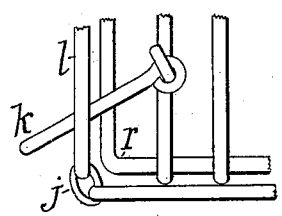
Figure 3:
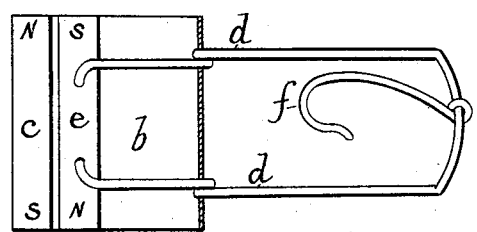

Figure 1 represents a side elevation of the same, with the near side wires broken away, excepting the two end ones, and the trap set ready to operate. Fig. 2 represents a perspective view of the trap partly folded up, and in which the dotted lines show the course and position of the different parts. Fig. 3 represents a plan from the under side of the magnets and plate to which they are attached, and lever which operates the magnets. Fig. 4 represents the lower corner of the rear part or end of the trap, showing its fastening device.

Like letters of reference indicate like parts.

The object of my invention is to construct a trap operated by the action of magnetic electricity, and which will not require any nice adjustment of parts, but be readily and quickly set, and which may also be folded together, so as to occupy the smallest possible space, and which, when required for use, can be set in a moment's time.

In the drawings, $a$ represents the body of a wire trap provided on the under side of the deck with a copper plate, $b$, or other non-magnetic material, to which is securely attached a permanent bar-magnet, $c$, and to the lever $d$ a permanent bar-magnet, $e$, of which the adjoining faces are beveled in the direction shown, so that the magnet $e$ may readily come in contact or be released from the fixed magnet $c$, and of which the opposite poles, N, S, are in contact. The arms of the lever $d$ are fulcrumed to the dependent part of the plate $b$, and to its outer ends is permanently attached the magnet $e$. The parts of this lever are so proportioned that the hook $f$, when baited, shall not quite overbalance the magnet, and which, in case the bait is too heavy, may be compensated for by moving the hook $f$ toward the fulcrum of the lever. The door of the trap is hung on the cross-bar $g$, extending across the front of the trap, by means of two or more flat loops, $h$, attached to the back of the door, which permit it to slide up and down. The loops $h$ and magnet $c$ are so placed that the door, when open, as shown in Fig. 1, is slightly heavier on the inside, and at the lower corner of the opening is a stop, $i$, to hold the lower end of the door from moving outward. The sides of the trap form single oblong rectangular pieces, which are united by loops $j$, upon which they freely turn as hinges. The rear end, $r$, is hung to the deck, and provided at its lower corners with bars or stops $k$, which are free to swing out laterally in front of the corners $l$, to secure the rear end from being pushed out. The door $o$, or at least its lower end, is preferably made of sheet-iron or metal that will form a magnetic contact with the fixed magnet $c$.

The object of uniting the parts of the trap, as shown, is to allow the side parts to fold on each other flatly, as shown in the dotted lines $m$, the corner $n$ passing to $n'$, and $p$ to $p'$, and the rear end, $r$, outward and around upon the top.

When the trap is to be set, the magnets are separated, as seen in Fig. 1, and the door $o$ raised and brought in contact with the magnet $c$, which by its attraction will hold the door in place, as shown, set. When the bars $e$ and $c$ are brought in contact, as when the bait is pulled down, the attraction of the door $o$ and magnet $c$ for each other is so weakened, owing to the well-known fact that the more permanent magnets have the greater attraction for each other, that it will be released and fall, and thus close the trap.

When the trap is to be packed away for shipping, the rear part, $r$, is released by means of the pins $k$, and thrown on the top of the trap, as seen dotted in Fig. 2, and the door $o$ placed against the deck. The top is then moved sidewise until the ends assume the position of the dotted lines $m$, the corner $n$ moving to $n'$, and $p$ to $p'$.

What I claim is—

1. In an animal-trap, the permanent magnets $c\ e$—one operated by a lever attached to the baiting-hook, and the other attached to the deck of the trap—in combination with a door, $o$, operated by gravity, substantially as specified.

2. In an animal-trap, the combination of the four sides and end $r$ with hinges $j$ and pins $k$, substantially as specified.

3. In an animal-trap, the combination of the four sides, end $r$, and hinges $j$ with a door provided with loops $h$, lever $d$, and magnets $c\ e$, substantially as specified.

4. In an animal-trap, a door closed by gravity, of which the lower edge is magnetic, in combination with magnets $c\ e$ and lever $d$, substantially as specified.

5. In an animal-trap, the combination of the four sides and end $r$, provided with pins $k$, all united by hinges $j$, and attached to one of said sides, a magnet, $c$, and the door, hung in loops $h$, magnet $e$, and lever $d$, substantially as specified.

PETER R. ERLING.

Witnesses:
 WM. ZIMMERMAN,
 L. W. PETERSON.